US012800967B2

(12) United States Patent
Kuo et al.

(10) Patent No.: US 12,800,967 B2
(45) Date of Patent: Nov. 17, 2026

(54) OPTICAL METASURFACE STRUCTURE AND MANUFACTURING METHOD THEREOF

(71) Applicant: UNITED MICROELECTRONICS CORP., Hsin-Chu City (TW)

(72) Inventors: Chih-Wei Kuo, Tainan City (TW); Yi-Wei Tseng, New Taipei City (TW); Hsuan-Hsu Chen, Tainan City (TW); Chung-Yi Chiu, Tainan City (TW)

(73) Assignee: UNITED MICROELECTRONICS CORP., Hsin-Chu City (TW)

( * ) Notice: Subject to any disclaimer, the term of this patent is extended or adjusted under 35 U.S.C. 154(b) by 149 days.

(21) Appl. No.: 19/057,906

(22) Filed: Feb. 19, 2025

(65) Prior Publication Data

US 2026/0202704 A1 Jul. 16, 2026

(30) Foreign Application Priority Data

Jan. 16, 2025 (TW) ................................. 114101745

(51) Int. Cl.
*G02F 1/1343* (2006.01)

(52) U.S. Cl.
CPC ................................ *G02F 1/13439* (2013.01)

(58) Field of Classification Search
CPC ........ G02F 1/13439; G02F 1/29; G02F 1/137; G02B 26/08; G02B 6/122; G02B 6/293; G02B 6/42; H01Q 15/00; H01Q 15/14; H01Q 15/02; H01Q 3/44; H01Q 1/38
See application file for complete search history.

(56) References Cited

U.S. PATENT DOCUMENTS

| | | | | |
|---|---|---|---|---|
| 11,079,654 | B2 * | 8/2021 | Watts | G02F 1/225 |
| 11,429,008 | B1 | 8/2022 | Akselrod | |
| 11,846,865 | B1 | 12/2023 | Akselrod | |
| 11,914,266 | B1 | 2/2024 | Akselrod | |
| 2018/0241131 | A1 * | 8/2018 | Akselrod | B29D 11/00326 |
| 2019/0285798 | A1 * | 9/2019 | Akselrod | G02B 6/1226 |
| 2023/0367171 | A1 | 11/2023 | Akselrod | |
| 2024/0353624 | A1 | 10/2024 | Akselrod | |
| 2025/0237927 | A1 * | 7/2025 | Josberger | G02F 1/292 |
| 2025/0328004 | A1 * | 10/2025 | Akselrod | G02B 26/0875 |

FOREIGN PATENT DOCUMENTS

| | | | |
|---|---|---|---|
| CN | 112042059 | A | 12/2020 |
| CN | 115793326 | A | 3/2023 |
| CN | 119278548 | A | 1/2025 |

* cited by examiner

*Primary Examiner* — Christopher E Leiby
(74) *Attorney, Agent, or Firm* — Winston Hsu

(57) ABSTRACT

An optical metasurface structure includes a substrate, a first metal rail structure, a second metal rail structure, a diffusion barrier layer, a high dielectric constant dielectric layer, and a liquid crystal material. The first metal rail structure and the second metal rail structure are disposed above the substrate. The diffusion barrier layer is disposed on the first metal rail structure and the second metal rail structure. The high dielectric constant dielectric layer is disposed on the diffusion barrier layer. The liquid crystal material is disposed above the substrate and at least a part of the liquid crystal material is located between the first metal rail structure and the second metal rail structure in a horizontal direction. The diffusion barrier layer has a first thickness, a portion of the high dielectric constant dielectric layer has a second thickness, and the first thickness is greater than the second thickness.

20 Claims, 8 Drawing Sheets

OPTICAL METASURFACE STRUCTURE AND MANUFACTURING METHOD THEREOF

BACKGROUND OF THE INVENTION

1. Field of the Invention

The present invention relates to an optical metasurface structure and a manufacturing method thereof, and more particularly, to an optical metasurface structure including a metal rail structure and a manufacturing method thereof.

2. Description of the Prior Art

Optical metasurfaces may be used to change many properties (such as amplitude, phase and/or polarization conditions) of incident radiation (such as incident light), and various specific functions (such as light beam control, focusing, and spectral filtering) may be realized accordingly. By combining the design of liquid crystal materials and applied voltage conditions, tunable optical metasurfaces can be realized, and the applications of the optical metasurfaces may be increased accordingly.

SUMMARY OF THE INVENTION

An optical metasurface structure and a manufacturing method thereof are provided in the present invention. A high dielectric constant dielectric layer is used to enhance voltage differential provided to a liquid crystal material located between metal rail structures, and operation performance of the optical metasurface structure may be improved accordingly.

According to an embodiment of the present invention, an optical metasurface structure is provided. The optical metasurface structure includes a substrate, a first metal rail structure, a second metal rail structure, a diffusion barrier layer, a high dielectric constant dielectric layer, and a liquid crystal material. The first metal rail structure and the second metal rail structure are disposed above the substrate. The diffusion barrier layer is disposed on the first metal rail structure and the second metal rail structure. The high dielectric constant dielectric layer is disposed on the diffusion barrier layer. The liquid crystal material is disposed above the substrate, and at least a part of the liquid crystal material is located between the first metal rail structure and the second metal rail structure in a horizontal direction. The diffusion barrier layer has a first thickness, a portion of the high dielectric constant dielectric layer has a second thickness, and the first thickness is greater than the second thickness.

According to an embodiment of the present invention, a manufacturing method of an optical metasurface structure is provided. The manufacturing method includes the following steps. A substrate is provided. A first metal rail structure and a second metal rail structure are formed above the substrate. A diffusion barrier layer is formed on the first metal rail structure and the second metal rail structure. A high dielectric constant dielectric layer is formed on the diffusion barrier layer. A liquid crystal material is formed above the substrate, and at least a part of the liquid crystal material is located between the first metal rail structure and the second metal rail structure in a horizontal direction. The diffusion barrier layer has a first thickness, a portion of the high dielectric constant dielectric layer has a second thickness, and the first thickness is greater than the second thickness.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2-7 are schematic drawings illustrating a manufacturing method of the optical metasurface structure according to the first embodiment of the present invention, wherein FIG. 3 is a schematic drawing in a step subsequent to FIG. 2, FIG. 4 is a schematic drawing in a step subsequent to FIG. 3, FIG. 5 is a schematic drawing in a step subsequent to FIG. 4, FIG. 6 is a schematic drawing in a step subsequent to FIG. 5, and FIG. 7 is a schematic drawing in a step subsequent to FIG. 6.

DETAILED DESCRIPTION

The present invention has been particularly shown and described with respect to certain embodiments and specific features thereof. The embodiments set forth herein below are to be taken as illustrative rather than limiting. It should be readily apparent to those of ordinary skill in the art that various changes and modifications in form and detail may be made without departing from the spirit and scope of the present invention.

Before the further description of the preferred embodiment, the specific terms used throughout the text will be described below.

The terms "on," "above," and "over" used herein should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

The ordinal numbers, such as "first", "second", etc., used in the description and the claims are used to modify the elements in the claims and do not themselves imply and represent that the claim has any previous ordinal number, do not represent the sequence of some claimed element and another claimed element, and do not represent the sequence of the manufacturing methods, unless an addition description is accompanied. The use of these ordinal numbers is only used to make a claimed element with a certain name clear from another claimed element with the same name.

The term "etch" is used herein to describe the process of patterning a material layer so that at least a portion of the material layer after etching is retained. When "etching" a material layer, at least a portion of the material layer is retained after the end of the treatment. In contrast, when the material layer is "removed", substantially all the material layer is removed in the process. However, in some embodiments, "removal" is considered to be a broad term and may include etching.

The term "forming" or the term "disposing" are used hereinafter to describe the behavior of applying a layer of material to the substrate. Such terms are intended to describe any possible layer forming techniques including, but not limited to, thermal growth, sputtering, evaporation, chemical vapor deposition, epitaxial growth, electroplating, and the like.

Figure 1:
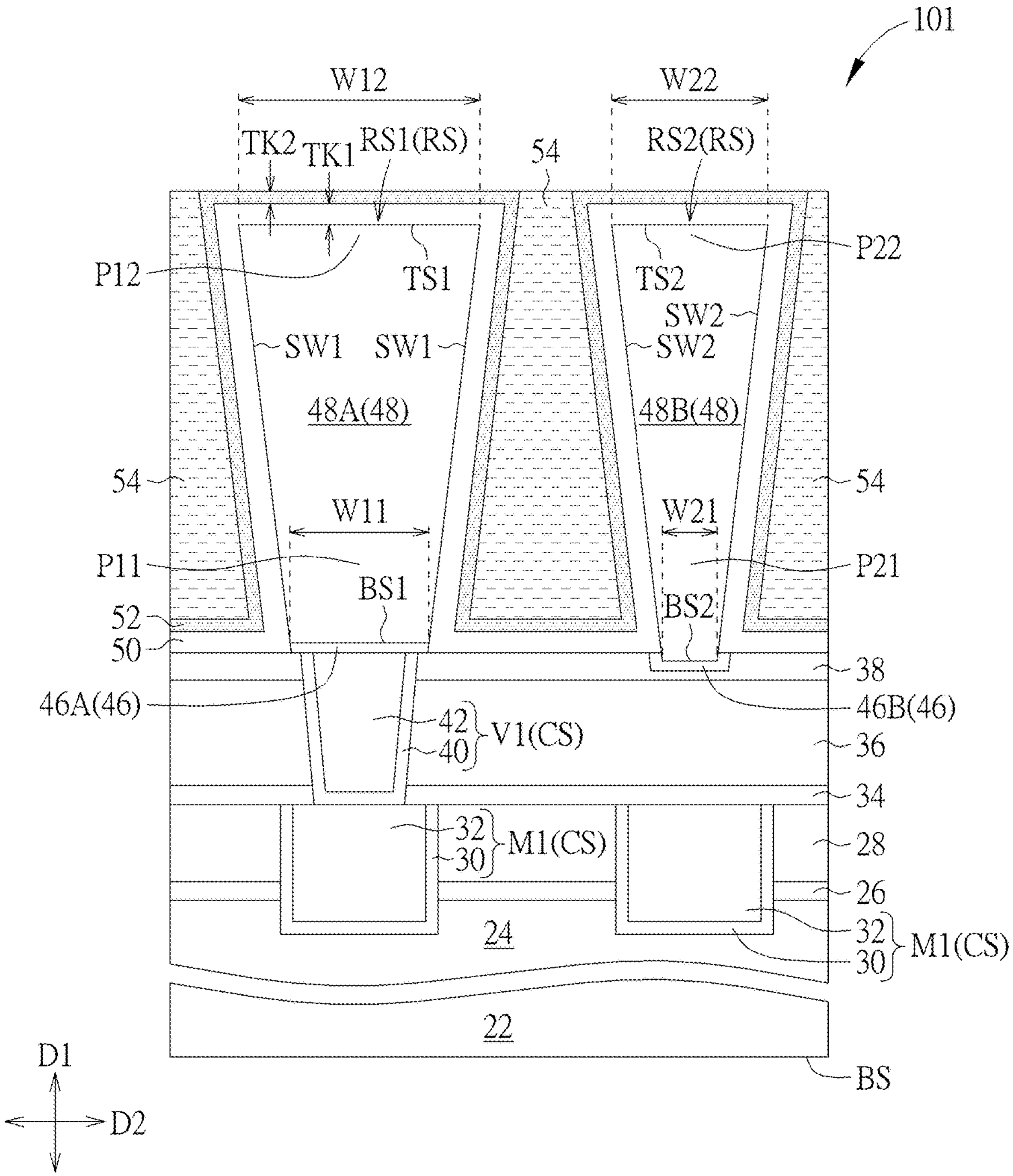
FIG. 1 is a schematic drawing illustrating an optical metasurface structure according to a first embodiment of the present invention.

Please refer to FIG. 1. FIG. 1 is a schematic drawing illustrating an optical metasurface structure 101 according to a first embodiment of the present invention. As shown in FIG. 1, the optical metasurface structure 101 includes a substrate 22, a first metal rail structure (such as a metal rail structure RS1), a second metal rail structure (such as a metal rail structure RS2), a diffusion barrier layer 50, a high dielectric constant dielectric layer 52, and a liquid crystal material 54. The metal rail structure RS1 and the metal rail structure RS2 are disposed above the substrate 22. The diffusion barrier layer 50 is disposed on the metal rail structure RS1 and the metal rail structure RS2. The high dielectric constant dielectric layer 52 is disposed on the diffusion barrier layer 50. The liquid crystal material 54 is disposed above the substrate 22, and at least a part of the liquid crystal material 54 is located between the metal rail structure RS1 and the metal rail structure RS2 in a horizontal direction D2. The diffusion barrier layer 50 has a first thickness (such as a thickness TK1), a portion of the high dielectric constant dielectric layer 52 has a second thickness (such as a thickness TK2), and the thickness TK1 is greater than the thickness TK2. In some embodiments, the optical metasurface structure 101 may include a plurality of metal rail structures RS (such as the metal rail structure RS1 and the metal rail structure RS2 described above) disposed above the substrate 22. The arrangement of liquid crystal molecules in the liquid crystal material 54 may be controlled by adjusting the voltage applied to each metal rail structure RS, so as to alter the angle of reflected light when the metal rail structures RS and the liquid crystal material 54 reflect incident light, and a tunable optical metasurface structure may be realized accordingly. In addition, the voltage differential provided to the liquid crystal material 54 located between the metal rail structures RS may be enhanced by the high dielectric constant dielectric layer 52, and the operation performance of the optical metasurface structure may be improved accordingly.

In some embodiments, a vertical direction D1 may be regarded as a thickness direction of the substrate 22, the substrate may have a top surface and a bottom surface BS opposite to the top surface in the vertical direction D1, and the metal rail structures RS and the liquid crystal material 54 described above may be disposed at the side of the top surface. A horizontal direction substantially orthogonal to the vertical direction D1 (such as the horizontal direction D2 and other directions orthogonal to the vertical direction D1) may be substantially parallel with the bottom surface BS of the substrate 22, but not limited thereto. In this description, a distance between the bottom surface BS of the substrate 22 and a relatively higher location and/or a relatively higher part in the vertical direction D1 may be greater than a distance between the bottom surface BS of the substrate 22 and a relatively lower location and/or a relatively lower part in the vertical direction D1. The bottom or a lower portion of each component may be closer to the bottom surface BS of the substrate 22 in the vertical direction D1 than the top or upper portion of this component. Another component disposed above a specific component may be regarded as being relatively far from the bottom surface BS of the substrate 22 in the vertical direction D1, and another component disposed under a specific component may be regarded as being relatively close to the bottom surface BS of the substrate 22 in the vertical direction D1. Additionally, in this description, a top surface and a top portion of a specific component may include but is not limited to the topmost surface and the topmost portion of this component in the vertical direction D1, and a bottom surface and a bottom portion of a specific component may include but is not limited to the bottommost surface and the bottommost portion of this component in the vertical direction D1. In this description, the condition that a certain component is disposed between two other components in a specific direction may include but is not limited to a condition that the certain component is sandwiched between the two other components in the specific direction.

In some embodiments, the optical metasurface structure 101 may further include a dielectric layer (such as a dielectric layer 24, an etching stop layer 26, a dielectric layer 28, an etching stop layer 34, a dielectric layer 36, and/or an etching stop layer 38) and a connection structure CS, and the substrate 22 may include a silicon substrate or a substrate made of other suitable semiconductor materials or non-semiconductor materials. The dielectric layer 24, the etching stop layer 26, the dielectric layer 28, the etching stop layer 34, the dielectric layer 36, and the etching stop layer 38 may be disposed and stacked sequentially above the substrate 22, and the connection structure CS may be disposed in the dielectric layer 24, the etching stop layer 26, the dielectric layer 28, the etching stop layer 34, the dielectric layer 36, and the etching stop layer 38. The dielectric layer 24, the dielectric layer 28, and the dielectric layer 36 may respectively include an oxide dielectric material (such as silicon oxide) or other suitable dielectric materials, and the etching stop layer 26, the etching stop layer 34, and the etching stop layer 38 may respectively include a nitride dielectric material, a carbide dielectric material (such as nitrogen doped carbide (NDC)) or other suitable dielectric materials. In some embodiments, the connection structure CS may include a plurality of electrically conductive lines M1 and a via conductors V1. Each of the electrically conductive lines M1 may be disposed in the dielectric layer 24, the etching stop layer 26, and the dielectric layer 28, and the via conductor V1 may be disposed in the etching stop layer 34, the dielectric layer 36, and the etching stop layer 38. The via conductor V1 may be disposed on and directly contact the corresponding electrically conductive line M1 in the vertical direction D1 for being electrically connected with the corresponding electrically conductive line M1. The metal rail structures RS may be disposed above the dielectric layer (such as the dielectric layer 24, the etching stop layer 26, the dielectric layer 28, the etching stop layer 34, the dielectric layer 36, and the etching stop layer 38) and the connection structure CS in the vertical direction D1, and the connection structure CS may be electrically connected with each of the metal rail structures RS.

In some embodiments, each of the electrically conductive lines M1 may include a barrier layer 30 and an electrically conductive material 32 disposed on the barrier layer 30, and the via conductor V1 may include a barrier layer 40 and an electrically conductive material 42 disposed on the barrier layer 40, but not limited thereto. The barrier layer 30 and the barrier layer 40 may respectively include titanium, titanium nitride, tantalum, tantalum nitride, or other suitable electrically conductive barrier materials, and the electrically conductive material 32 and the electrically conductive material 42 may respectively include a material with relatively low electrical resistivity, such as copper, aluminum, and/or tungsten. In some embodiments, active components (such as transistors and/or diodes), passive components (such as capacitors and/or resistors), and/or other related circuits (not illustrated) may be disposed on the substrate 22 according to some design considerations, the metal rail structure RS may be electrically connected with the components and/or the circuits described above via the connection structure CS, and the electric potential of each metal rail structure RS may be controlled by specific component and/or circuit, but not limited thereto. In some embodiments, the material composition of the dielectric layer 24 and the material composition of the substrate 22 may be the same, the dielectric layer 24 and the substrate 22 may be regarded together as one substrate structure, and there is not any above-mentioned component and/or circuit disposed in the dielectric layer 24 and the substrate 22. A plurality of bonding pads (not illustrated) may be disposed above the substrate 22, and each of the bonding pads may be electrically connected with the corresponding metal rail structure RS via the connection structure CS for controlling the electric potential of each of the metal rail structures RS.

In some embodiments, each of the metal rail structures RS may include a barrier layer and a metal layer disposed on the barrier layer. For example, the metal rail structure RS1 may include a barrier layer 46A and a metal layer 48A disposed on the barrier layer 46A, and the metal rail structure RS2 may include a barrier layer 46B and a metal layer 48B disposed on the barrier layer 46B. Because of the influence of related manufacturing processes, a bottom surface of the barrier layer 46A located above the via conductor V1 may be higher than a bottom surface of the barrier layer 46B without being disposed above the via conductor V1 in the vertical direction D1, but not limited thereto. The barrier layer 46A and the barrier layer 46B may respectively include titanium, titanium nitride, tantalum, tantalum nitride, or other suitable electrically conductive barrier materials, and the metal layer 48A and the metal layer 48B may respectively include copper or other suitable metallic materials.

In some embodiments, at least a part of each of the metal rail structures RS may have an inverted trapezoid structure that is wide at the top and narrow at the bottom in a cross-sectional diagram of the optical metasurface structure 101 (such as FIG. 1), a width of at least a part of each of the metal rail structures RS may gradually and/or continuously decrease from a top surface to a bottom surface of the metal rail structure RS, but not limited thereto. For example, as illustrated in FIG. 1, a width of the metal rail structure RS1 may gradually and/or continuously decrease from a top surface TS1 to a bottom surface, a width of the metal layer 48A may gradually and/or continuously decrease from the top surface TS1 to a bottom surface BS1 (such as gradually decreasing from a width W12 to a width W11), and a width of the metal layer 48B in the metal rail structure RS2 may gradually and/or continuously decrease from a top surface TS2 to a bottom surface BS2 (such as gradually decreasing from a width W22 to a width W21). Therefore, the metal rail structure RS1 may include a first portion P11 and a second portion P12, the second portion P12 is disposed above the first portion P11 in the vertical direction D1, and a width of the second portion P12 is greater than a width of the first portion P11. Similarly, the metal rail structure RS2 may include a first portion P21 and a second portion P22, the second portion P12 is disposed above the first portion P22 in the vertical direction D1, and a width of the second portion P22 is greater than a width of the first portion P21.

In some embodiments, the dimensions of the metal rail structures RS may be substantially the same or different from one another according to some design considerations. For example, the width of the metal rail structure RS2 (such as the width W22) may be less than the width of the metal rail structure RS1 (such as the width W12), but not limited thereto. In some embodiments, at least a part of each of the metal rail structures RRS may be elongated substantially in another horizontal direction (such as a horizontal direction orthogonal to the horizontal direction D2 and the vertical direction D1, respectively), and a length of each of the metal rail structures RS in the horizontal direction D2 may be regarded as the width described above, but not limited thereto. In some embodiments, a bottom width of each of the metal rail structures RS may be greater than a top width of the corresponding via conductor V1, and the electrically conductive material 42 of the via conductor V1 may be surrounded by the barrier layer 40 and the barrier layer of the metal rail structure RS (such as the barrier layer 46A) for improving barrier performance, but not limited thereto.

In some embodiments, the diffusion barrier layer 50 may be disposed conformally on the metal rail structures RS and the etching stop layer 38 substantially, and the diffusion barrier layer 50 may have a substantially uniform thickness (such as the thickness TK1), but not limited thereto. The diffusion barrier layer 50 may include silicon nitride or other suitable dielectric materials with the required diffusion barrier performance. In some embodiments, the high dielectric constant dielectric layer 52 may be disposed conformally on the diffusion barrier layer 50 substantially, and the high dielectric constant dielectric layer 52 may have a substantially uniform thickness (such as the thickness TK2), but not limited thereto. It is worth noting that, the thickness TK1 may be regarded as a thickness of the diffusion barrier layer 50 located above the metal rail structure RS in the vertical direction D1, and the thickness TK2 may be regarded as a thickness of the high dielectric constant dielectric layer 52 located above the metal rail structure RS in the vertical direction D1. In some embodiments, the diffusion barrier layer needs to be of a specific thickness to provide the required diffusion barrier performance, and the thickness TK1 may be greater than the thickness TK2 accordingly. The thickness TK1 may substantially range from 80 angstroms to 100 angstroms, the thickness TK2 may substantially range from 30 angstroms to 50 angstroms, and a ratio of the thickness TK1 to the thickness TK2 may be greater than or equal to 1.6, but not limited thereto. In addition, a dielectric constant of the high dielectric constant dielectric layer 52 is greater than a dielectric constant of the diffusion barrier layer 50. In some embodiments, the dielectric constant of the high dielectric constant dielectric layer 52 may be greater than 10, and in some embodiments, the dielectric constant of the high dielectric constant dielectric layer is greater than or equal to 30 for further improving the performance of enhancing the voltage differential, but not limited thereto. The high dielectric constant dielectric layer 52 may include hafnium oxide (such as $Hf_xO_y$), zirconium oxide (such as $Zr_xO_y$), yttrium oxide (such as $Y_2O_3$), tantalum oxide (such as $Ta_2O_5$), titanium oxide (such as $TiO_2$), lanthanum oxide (such as $La_xO_y$), or other suitable high dielectric constant dielectric materials.

Because of the shape of the metal rail structure RS, a part of the diffusion barrier layer 50 may be disposed on a sidewall of the metal rail structure RS and located directly under the sidewall of the metal rail structure RS in the vertical direction D1. For example, a part of the diffusion barrier layer 50 may be disposed on a sidewall SW1 of the metal rail structure RS1 and located directly under the sidewall SW1 of the metal rail structure RS1 in the vertical direction D1, and another part of the diffusion barrier layer 50 may be disposed on a sidewall SW2 of the metal rail structure RS2 and located directly under the sidewall SW2 of the metal rail structure RS2 in the vertical direction D1. In addition, a part of the high dielectric constant dielectric layer 52 may be sandwiched between the liquid crystal material 54 and the diffusion barrier layer 50 in the horizontal direction D2 and located directly under the diffusion barrier layer 50 in the vertical direction D1. In some embodiments, the thickness of the diffusion barrier layer 50 disposed on the sidewall of the metal rail structure RS in the horizontal direction D2 may be substantially equal to the thickness of the diffusion barrier layer 50 disposed above the metal rail structure RS in the vertical direction D1 (such as the thickness TK1), and the thickness of the high dielectric constant dielectric layer 52 disposed on the sidewall of the metal rail structure RS in the horizontal direction D2 may be substantially equal to the thickness of the high dielectric constant dielectric layer 52 disposed above the metal rail structure RS in the vertical direction D1 (such as the thickness TK2), but not limited thereto.

In some embodiments, the arrangement of liquid crystal molecules in the liquid crystal material 54 may be controlled by adjusting the voltage applied to each metal rail structure RS, so as to alter the angle of reflected light when the metal rail structures RS and the liquid crystal material 54 reflect incident light. By adjusting voltage applied to each of the metal rail structures RS, the optical metasurface structure in the present invention may be capable of reflecting incident light with different angles into the same specific angle and/or reflecting incident light with a specific angle into different angles, and the optical metasurface structure in the present invention may be regarded as a tunable optical metasurface structure accordingly. In addition, the width, the height, and the length of each of the metal rail structures RS and the spacing between the metal rail structures RS may be modified according to the wavelength range of the corresponding operation light for generating the desired resonance effect. For example, the spacing between metal rail structures RS may be less than the wavelength of the operation light, but not limited thereto.

Figure 2:
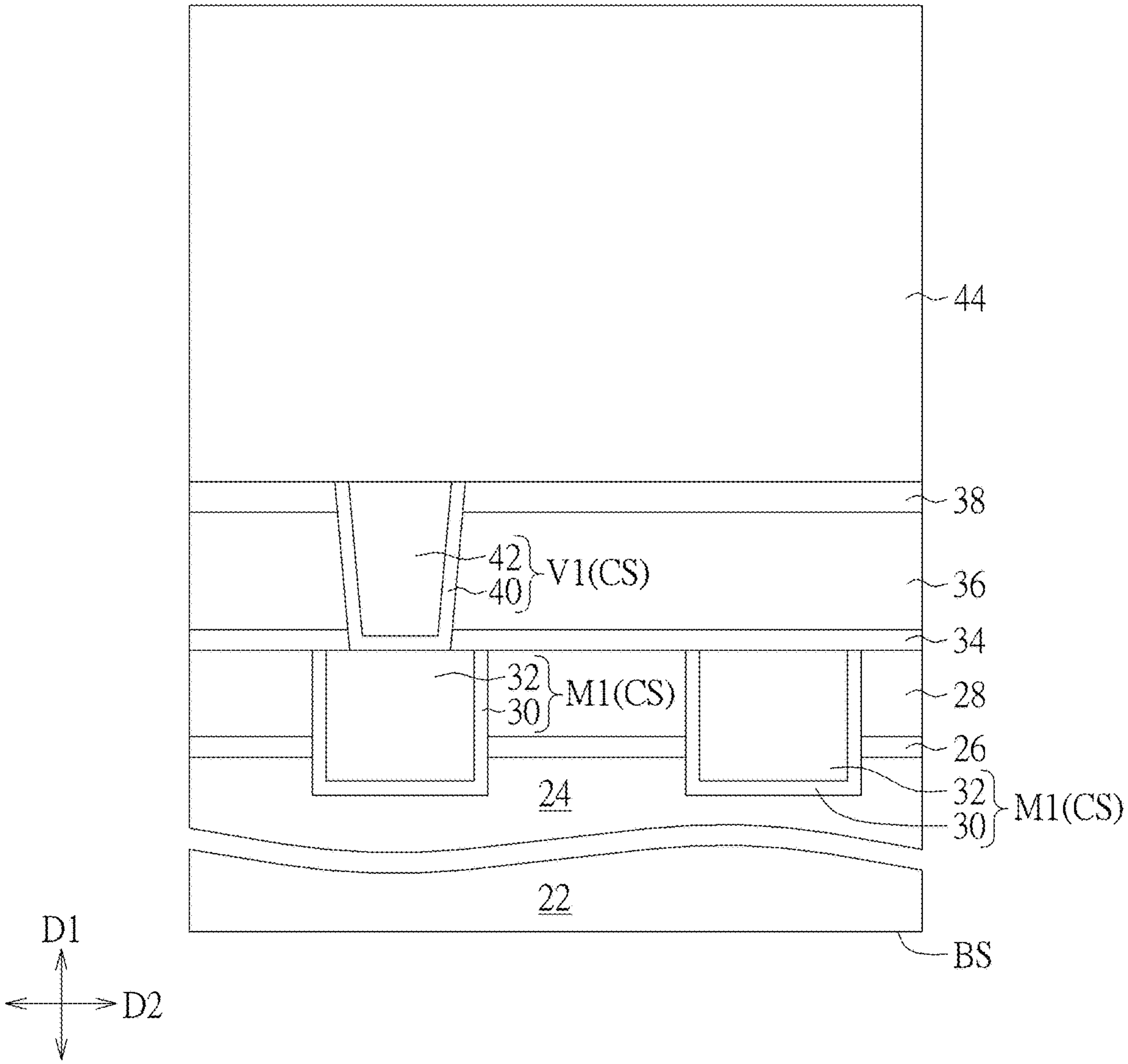
Figure 3:
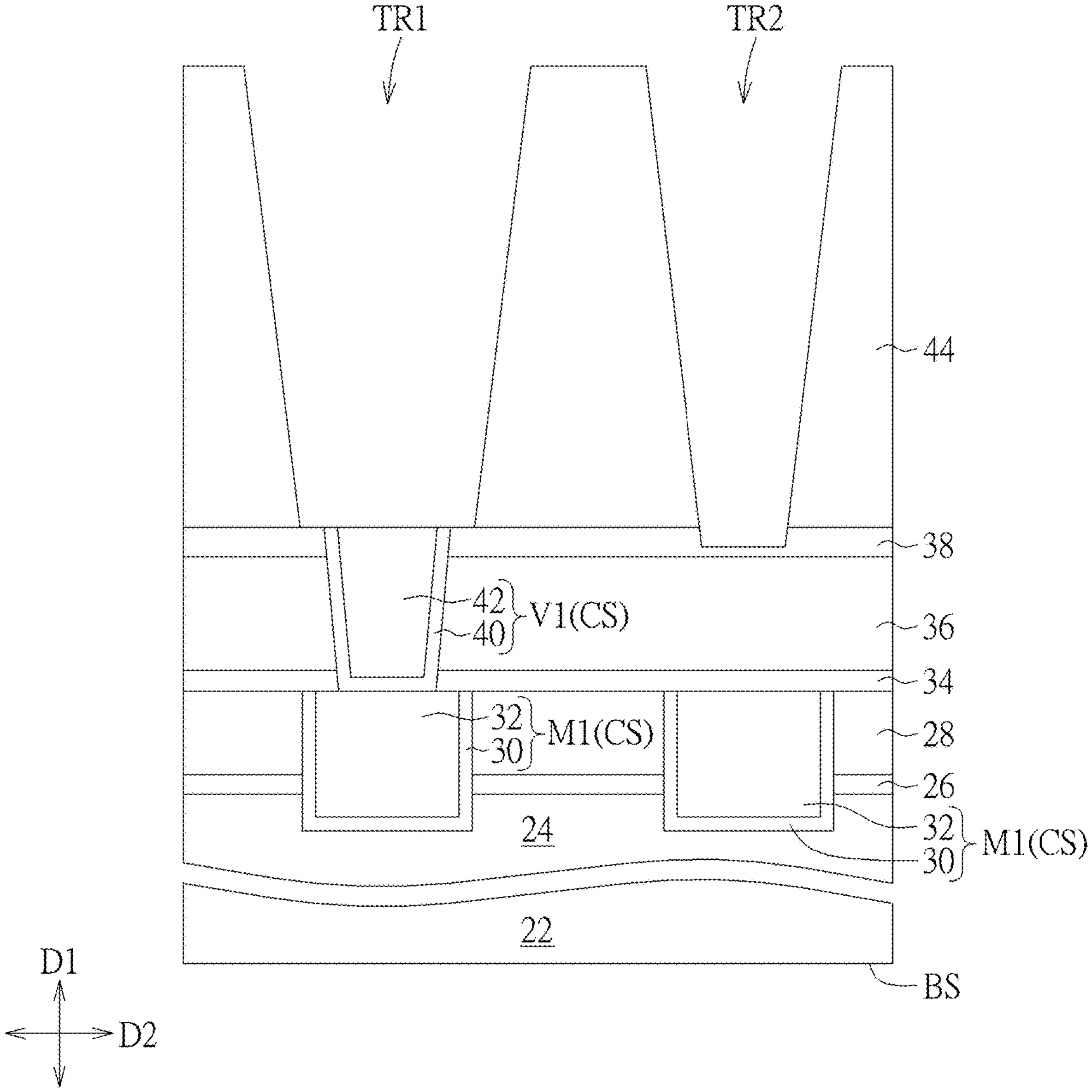
Figure 4:
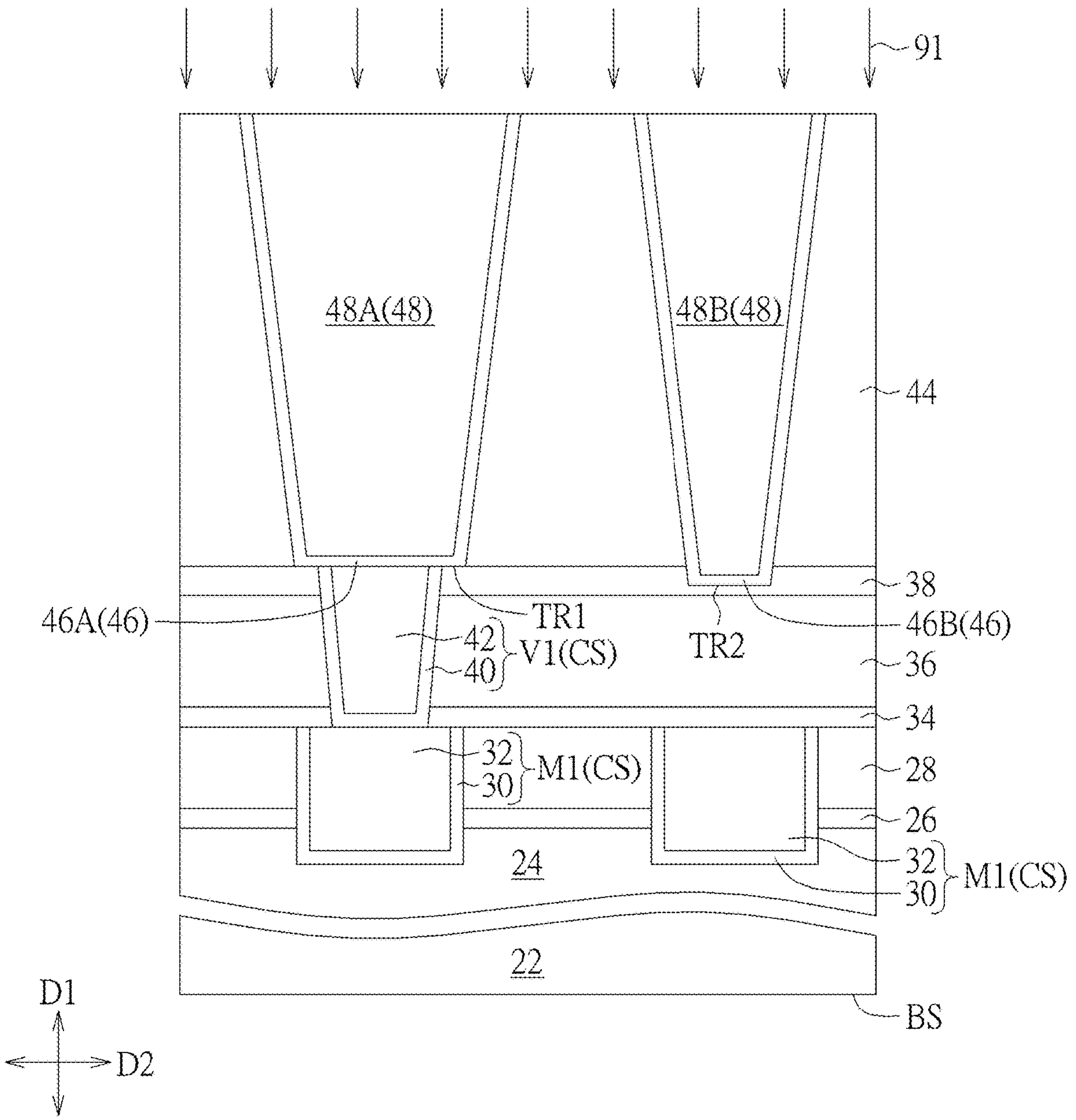
Figure 5:
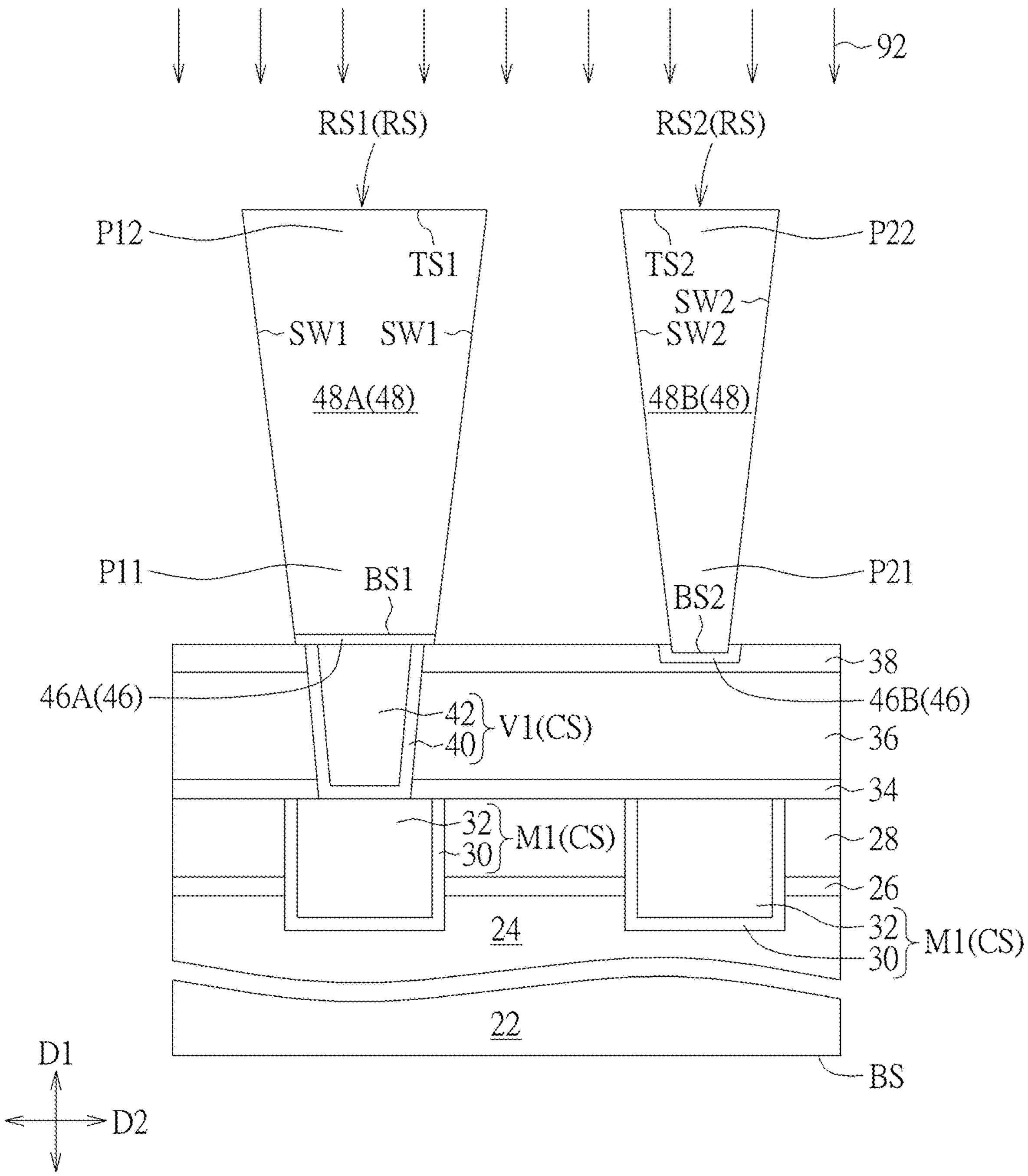
Figure 6:
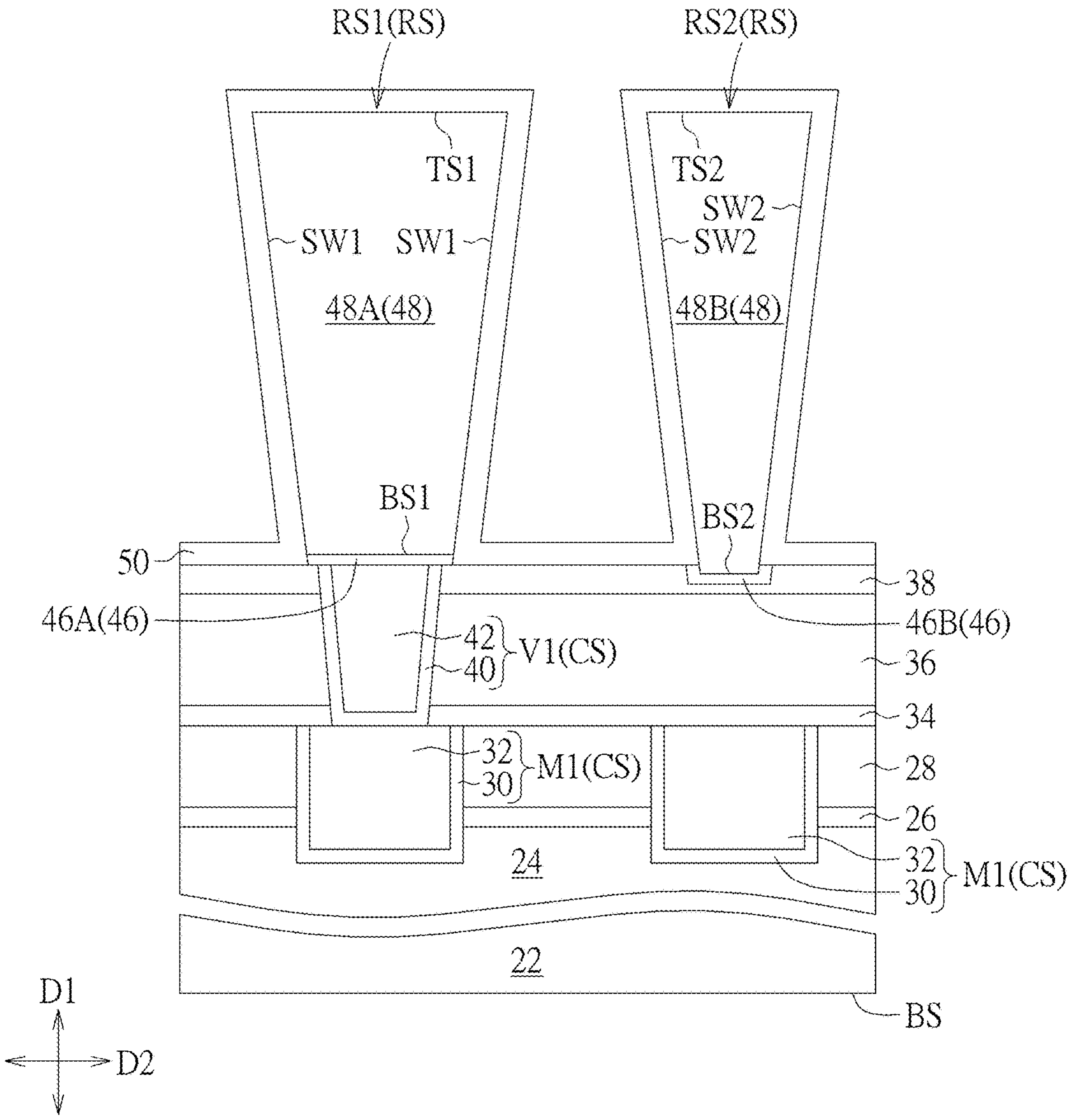
Figure 7:
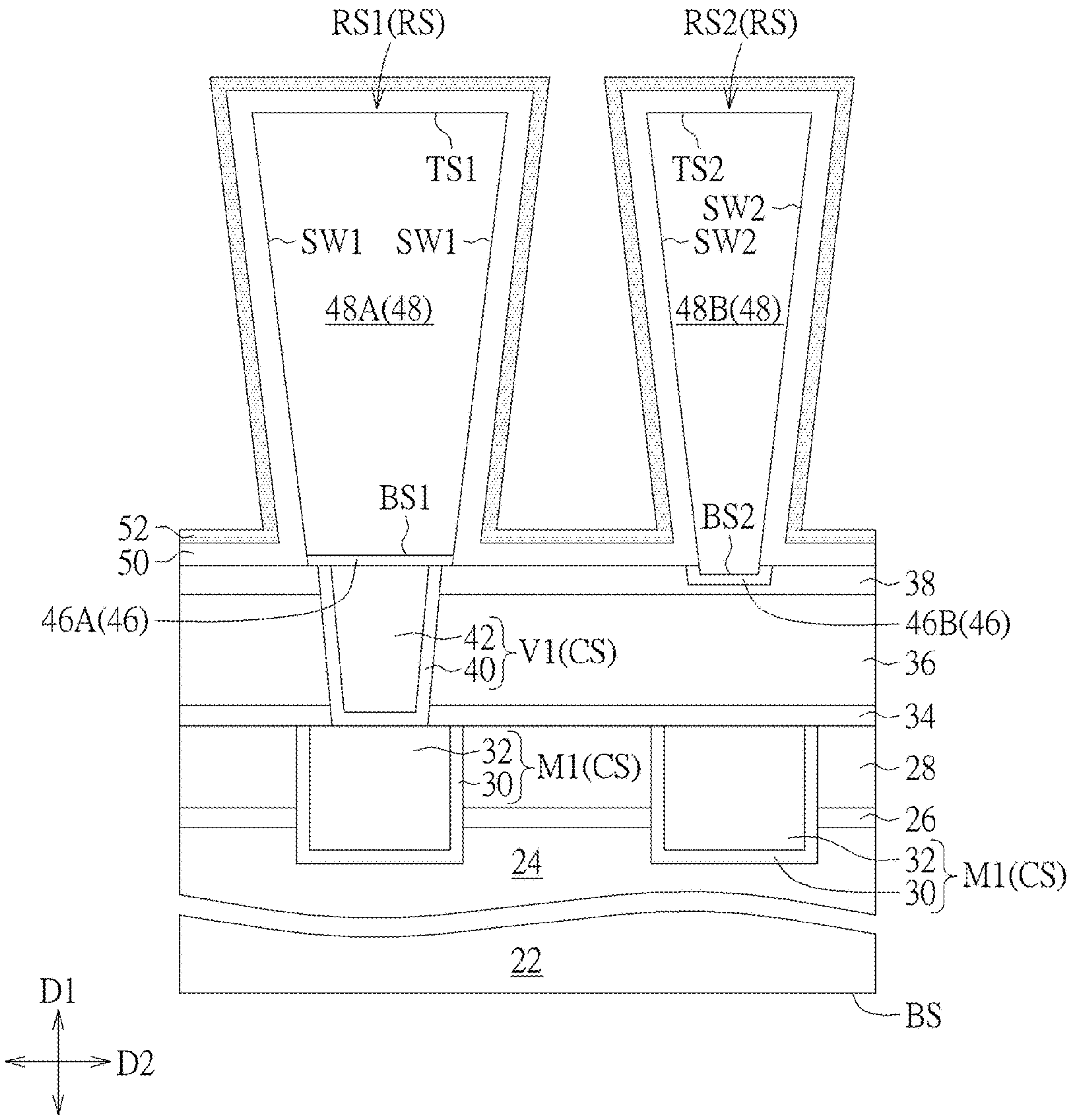

Please refer to FIG. 1 and FIGS. 2-7. FIGS. 2-7 are schematic drawings illustrating a manufacturing method of the optical metasurface structure according to the first embodiment of the present invention, wherein FIG. 3 is a schematic drawing in a step subsequent to FIG. 2, FIG. 4 is a schematic drawing in a step subsequent to FIG. 3, FIG. 5 is a schematic drawing in a step subsequent to FIG. 4, FIG. 6 is a schematic drawing in a step subsequent to FIG. 5, and FIG. 7 is a schematic drawing in a step subsequent to FIG. 6. In some embodiments, FIG. 1 may be regarded as a schematic drawing in a step subsequent to FIG. 7, but not limited thereto. As shown in FIG. 1, the manufacturing method in this embodiment includes the following steps. Firstly, the substrate 22 is provided. A first metal rail structure (such as the metal rail structure RS1) and a second metal rail structure (such as the metal rail structure RS2) are formed above the substrate 22. The diffusion barrier layer 50 is formed on the metal rail structure RS1 and the metal rail structure RS2. The high dielectric constant dielectric layer 52 is formed on the diffusion barrier layer 50. The liquid crystal material 54 is formed above the substrate 22, and at least a part of the liquid crystal material 54 is located between the metal rail structure RS1 and the metal rail structure RS2 in the horizontal direction D2. The diffusion barrier layer 50 has a first thickness (such as the thickness TK1), a portion of the high dielectric constant dielectric layer 52 has a second thickness (such as the thickness TK2), and the thickness TK1 is greater than the thickness TK2.

Specifically, the manufacturing method in this embodiment may include but is not limited to the following steps. As shown in FIG. 2, before the metal rail structures described above are formed, the dielectric layer (such as the dielectric layer 24, the etching stop layer 26, the dielectric layer 28, the etching stop layer 34, the dielectric layer 36, and/or the etching stop layer 38) may be formed on the substrate 22, and the connection structure CS may be formed in the dielectric layer. After the dielectric layer described above and the connection structure CS are formed, a dielectric layer 44 may be formed on the substrate 22, and the dielectric layer 44 may include tetraethoxysilane (TEOS) oxide or other suitable materials. Subsequently, as shown in FIG. 3, trenches may be formed penetrating through the dielectric layer 44. For example, a first trench (such as a trench TR1) and a second trench (such as a trench TR2) may respectively penetrate through the dielectric layer 44. In some embodiments, the trenches described above may be further partly located in the etching stop layer 38, and at least a part of the trench may be formed above the via conductor V1 because the process of forming the trenches (such as an etching process, but not limited thereto) may be influenced by the via conductor V1. As shown in FIG. 4, a first barrier layer (such as the barrier layer 46A) and a second barrier layer (such as the barrier layer 46B) may be formed in the trench TR1 and the trench TR2, respectively, and a first metal layer (such as the metal layer 48A) and a second metal layer (such as the metal layer 48B) may be formed in the trench TR1 and the trench TR2, respectively. In some embodiments, a barrier material 46 may be formed conformally on the trench TR1, the trench TR2, and the dielectric layer 44, and a metal material 48 may be formed on the barrier material 46. Therefore, the barrier material 46 and the metal material 48 may be partly formed in the trench TR1 and the trench TR2 and partly formed outside the trench TR1 and the trench TR2, and the trench TR1 and the trench TR2 may be filled with the barrier material 46 and the metal material 48. Substantially, a planarization process (such as a chemical mechanical polishing process, but not limited thereto) may be performed for removing the barrier material 46 and the metal material 48 located outside the trench TR1 and the trench TR2, so as to form the barrier layer 46A, the barrier layer 46B, the metal layer 48A, and the metal layer 48B.

Subsequently, as shown in FIG. 4 and FIG. 5, a removing process 91 may be performed for removing the dielectric layer 44. In some embodiments, the dielectric layer 44 may be completely removed by the removing process 91, and a part of the barrier layer 46A and a part of the barrier layer 46B may be removed by the removing process 91. After the removing process 91, the remaining barrier layer 46A and the remaining metal layer 48A may constitute the metal rail structure RS1, and the remaining barrier layer 46B and the remaining metal layer 48B may constitute the metal rail structure RS2. The removing process may include a buffer oxide etching (BOE) process or other suitable removing approaches. It is worth noting that the method of forming the metal rail structure RS1 and the metal rail structure RS2 may include but is not limited to the steps illustrated in FIGS. 2-5 described above, and the metal rail structures RS may be formed by other suitable approaches according to some design considerations. Subsequently, as shown in FIG. 5 and FIG. 6, the diffusion barrier layer 50 may be formed conformally on the metal rail structure RS1, the metal rail structure RS2, and the etching stop layer 38. As shown in FIGS. 4-6, in some embodiments, a hydrogen treatment 92 may be performed to the metal layer 48A and the metal layer 48B after the removing process 91 and before the diffusion barrier layer 50 is formed for generating reduction effect to the metal layer 48A and the metal layer 48B that may be oxidized during the removing process and reducing negative influence of the removing process 91 on the metal layer 48A and the metal layer 48B, but not limited thereto. The hydrogen treatment 92 may include a hydrogen plasma treatment or other suitable approaches.

As shown in FIG. 7, after the diffusion barrier layer 50 is formed, the high dielectric constant dielectric layer 52 may be formed conformally on the diffusion barrier layer 50. Because of the shape of the metal rail structure RS, a part of the diffusion barrier layer 50 may be formed on the sidewall of the metal rail structure RS and located directly under the sidewall of the metal rail structure RS in the vertical direction D1, and a part of the high dielectric constant dielectric layer 52 may be formed on the sidewall of the metal rail structure RS and located directly under the diffusion barrier layer 50 in the vertical direction D1. Subsequently, as shown in FIG. 1, the liquid crystal material 54 may be formed for forming the optical metasurface structure 101.

The following description will detail the different embodiments of the present invention. To simplify the description, the following description will detail the dissimilarities among different embodiments and the identical features will not be redundantly described. In addition, identical components in each of the following embodiments are marked with identical symbols for making it easier to understand the differences between the embodiments.

Figure 8:
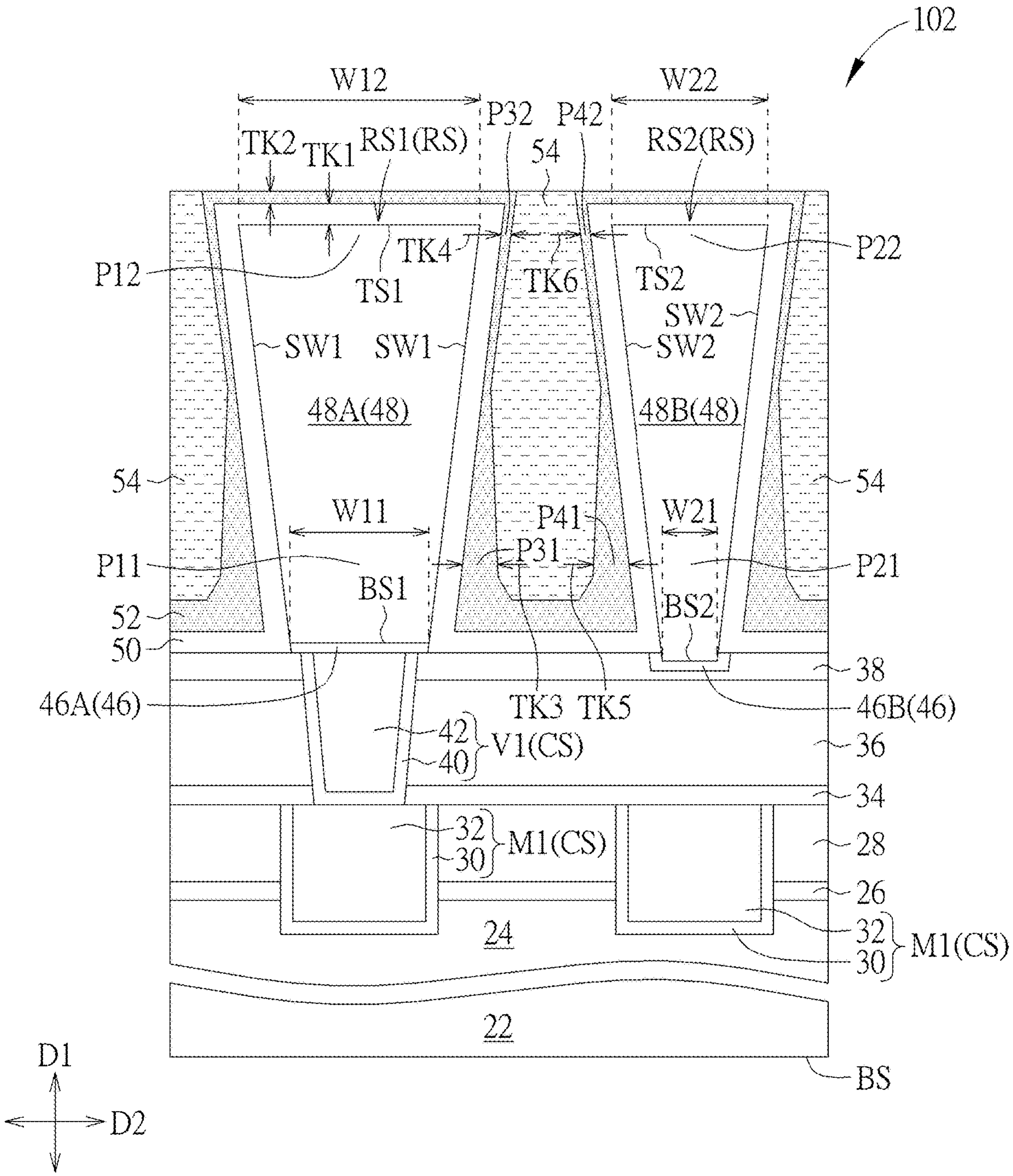
FIG. 8 is a schematic drawing illustrating an optical metasurface structure according to a second embodiment of the present invention.

Please refer to FIG. 8. FIG. 8 is a schematic drawing illustrating an optical metasurface structure 102 according to a second embodiment of the present invention. As shown in FIG. 8, in the optical metasurface structure 102, the thickness distribution of the high dielectric constant dielectric layer 52 located between the metal rail structures RS adjacent to each other may be modified to be thinner at the upper portion and thicker at the lower portion for compensating the uneven distribution of the driving effect to the liquid crystal material 54 because of the metal rail structure RS that is wide at the top and narrow at the bottom. For example, the high dielectric constant dielectric layer 52 disposed on the metal rail structure RS1 may include a first portion P31 and a second portion P32. The first portion P31 may be sandwiched between the first portion P11 of the metal rail structure RS1 and the liquid crystal material 54 in the horizontal direction D2, the second portion P32 may be sandwiched between the second portion P12 of the metal rail structure RS1 and the liquid crystal material 54 in the horizontal direction D2, a thickness TK3 of the first portion P31 in the horizontal direction D2 may be greater than a thickness TK4 of the second portion P32 in the horizontal direction D2. Similarly, the high dielectric constant dielectric layer disposed on the metal rail structure RS2 may include a first portion P41 and a second portion P42. The first portion P41 may be sandwiched between the first portion P21 of the metal rail structure RS2 and the liquid crystal material 54 in the horizontal direction D2, the second portion P42 may be sandwiched between the second portion P22 of the metal rail structure RS2 and the liquid crystal material 54 in the horizontal direction D2, a thickness TK5 of the first portion P41 in the horizontal direction D2 may be greater than a thickness TK6 of the second portion P42 in the horizontal direction D2, but not limited thereto. In some embodiments, the thickness TK3 and the thickness TK5 may be respectively greater than the thickness TK2 of the high dielectric constant dielectric layer 52 disposed above the metal rail structure RS in the vertical direction D1, and the thickness TK4 and the thickness TK6 may be respectively and slightly less than the thickness TK2 of the high dielectric constant dielectric layer 52 disposed above the metal rail structure RS in the vertical direction D1, but not limited thereto. In addition, the thickness distribution of the high dielectric constant dielectric layer 52 may be achieved by modifying the process condition of the film forming process of the high dielectric constant dielectric layer 52, modifying the film forming approach of the high dielectric constant dielectric layer 52 (such as forming the high dielectric constant dielectric layer 52 from the bottom of the space between the metal rail structures RS to the top of the space, but not limited thereto), and/or performing a suitable partially removing process (such as an etching process, but not limited thereto) after the film forming process.

To summarize the above descriptions, in the optical metasurface structure and the manufacturing method thereof according to the present invention, the high dielectric constant dielectric layer is used to enhance voltage differential provided to the liquid crystal material located between metal rail structures, and the operation performance of the optical metasurface structure may be improved accordingly. Additionally, in some embodiments, the thickness distribution of the high dielectric constant dielectric layer may be modified for compensating the negative influence of the shape of the metal rail structure on driving the liquid crystal material, and the operation performance of the optical metasurface structure may be further improved accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical metasurface structure, comprising:

a substrate;

a first metal rail structure and a second metal rail structure, wherein the first metal rail structure and the second metal rail structure are disposed above the substrate;

a diffusion barrier layer disposed on the first metal rail structure and the second metal rail structure;

a high dielectric constant dielectric layer disposed on the diffusion barrier layer; and a liquid crystal material disposed above the substrate, wherein at least a part of the liquid crystal material is located between the first metal rail structure and the second metal rail structure in a horizontal direction, the diffusion barrier layer has a first thickness, a portion of the high dielectric constant dielectric layer has a second thickness, and the first thickness is greater than the second thickness.

2. The optical metasurface structure according to claim 1, wherein a dielectric constant of the high dielectric constant dielectric layer is greater than a dielectric constant of the diffusion barrier layer.

3. The optical metasurface structure according to claim 1, wherein a dielectric constant of the high dielectric constant dielectric layer is greater than 10.

4. The optical metasurface structure according to claim 1, wherein a dielectric constant of the high dielectric constant dielectric layer is greater than or equal to 30.

5. The optical metasurface structure according to claim 1, wherein a ratio of the first thickness to the second thickness is greater than or equal to 1.6.

6. The optical metasurface structure according to claim 1, wherein the first metal rail structure comprises:

a first portion; and a second portion disposed above the first portion, wherein a width of the second portion is greater than a width of the first portion.

7. The optical metasurface structure according to claim 6, wherein the high dielectric constant dielectric layer comprises:

a first portion sandwiched between the first portion of the first metal rail structure and the liquid crystal material in the horizontal direction; and a second portion sandwiched between the second portion of the first metal rail structure and the liquid crystal material in the horizontal direction, wherein a thickness of the first portion of the high dielectric constant dielectric layer in the horizontal direction is greater than a thickness of the second portion of the high dielectric constant dielectric layer in the horizontal direction.

8. The optical metasurface structure according to claim 1, wherein a part of the diffusion barrier layer is located directly under a sidewall of the first metal rail structure in a vertical direction.

9. The optical metasurface structure according to claim 1, wherein a part of the high dielectric constant dielectric layer is located directly under the diffusion barrier layer in a vertical direction.

10. The optical metasurface structure according to claim 1, wherein the first metal rail structure comprises an inverted trapezoid structure in a cross-sectional view of the optical metasurface structure.

11. A manufacturing method of an optical metasurface structure, comprising:

providing a substrate;

forming a first metal rail structure and a second metal rail structure above the substrate;

forming a diffusion barrier layer on the first metal rail structure and the second metal rail structure;

forming a high dielectric constant dielectric layer on the diffusion barrier layer; and forming a liquid crystal material above the substrate, wherein at least a part of the liquid crystal material is located between the first metal rail structure and the second metal rail structure in a horizontal direction, the diffusion barrier layer has a first thickness, a portion of the high dielectric constant dielectric layer has a second thickness, and the first thickness is greater than the second thickness.

12. The manufacturing method of the optical metasurface structure according to claim 11, wherein a method of forming the first metal rail structure and the second metal rail structure comprises:

forming a dielectric layer above the substrate;

forming a first trench and a second trench penetrating through the dielectric layer;

forming a first barrier layer and a second barrier layer in the first trench and the second trench, respectively;

forming a first metal layer and a second metal layer in the first trench and the second trench, respectively; and performing a removing process for removing the dielectric layer.

13. The manufacturing method of the optical metasurface structure according to claim 12, wherein a part of the first barrier layer and a part of the second barrier layer are removed by the removing process.

14. The manufacturing method of the optical metasurface structure according to claim 12, further comprising:

performing a hydrogen treatment to the first metal layer and the second metal layer after the removing process and before the diffusion barrier layer is formed.

15. The manufacturing method of the optical metasurface structure according to claim 11, wherein the diffusion barrier layer is formed conformally on the first metal rail structure and the second metal rail structure, and the high dielectric constant dielectric layer is formed conformally on the diffusion barrier layer.

16. The manufacturing method of the optical metasurface structure according to claim 11, wherein a dielectric constant of the high dielectric constant dielectric layer is greater than a dielectric constant of the diffusion barrier layer.

17. The manufacturing method of the optical metasurface structure according to claim 11, wherein the first metal rail structure comprises:

a first portion; and a second portion disposed above the first portion, wherein a width of the second portion is greater than a width of the first portion.

18. The manufacturing method of the optical metasurface structure according to claim 17, wherein the high dielectric constant dielectric layer comprises:

a first portion sandwiched between the first portion of the first metal rail structure and the liquid crystal material in the horizontal direction; and a second portion sandwiched between the second portion of the first metal rail structure and the liquid crystal material in the horizontal direction, wherein a thickness of the first portion of the high dielectric constant dielectric layer in the horizontal direction is greater than a thickness of the second portion of the high dielectric constant dielectric layer in the horizontal direction.

19. The manufacturing method of the optical metasurface structure according to claim 11, wherein a part of the diffusion barrier layer is located directly under a sidewall of the first metal rail structure in a vertical direction.

20. The manufacturing method of the optical metasurface structure according to claim 11, wherein a part of the high dielectric constant dielectric layer is located directly under the diffusion barrier layer in a vertical direction.

* * * * *